J. B. BLAIR.

Rubber Eraser for Lead Pencils.

No. 6,510. Reissued June 29, 1875.

Witnesses.

Edward Skinner

Henry Coleman

Inventor:

John B. Blair Assto
The Rubber Tip Pencil Company
By Wm H Ellsworth
Attys.

UNITED STATES PATENT OFFICE.

JOHN B. BLAIR, OF PHILADELPHIA, PA., ASSIGNOR, BY MESNE ASSIGNMENTS, TO THE RUBBER TIP PENCIL COMPANY, OF NEW YORK CITY.

IMPROVEMENT IN RUBBER ERASERS FOR LEAD-PENCILS.

Specification forming part of Letters Patent No. 66,938, dated July 23, 1867; reissue No. 6,510, dated June 29, 1875; application filed April 1, 1875.

*To all whom it may concern:*

Be it known that JOHN B. BLAIR, of Philadelphia, Pennsylvania, invented a certain new and useful Improvement in Rubber Erasers for Lead-Pencils, of which the following is a specification:

This invention is illustrated in the accompanying drawing, in which—

Figure 1:
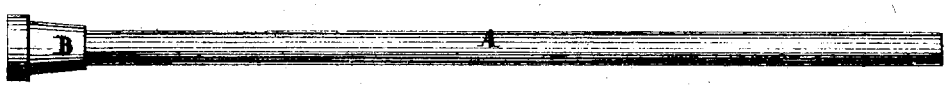
Figure 2:
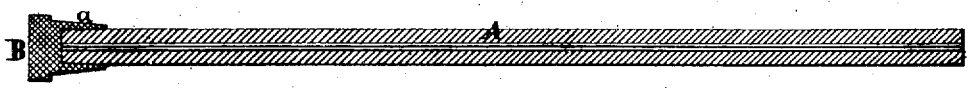
Figure 3:
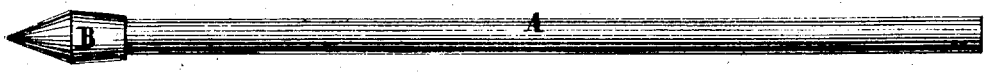

Figure 1 represents an elevation of a pencil provided with a solid elastic erasive head, constructed in accordance with this invention. Fig. 2 is a longitudinal section of the same. Fig. 3 is an elevation of the same, the form of the head being modified.

Similar letters indicate corresponding parts.

This invention consists in combining, with a pencil, a solid elastic erasive head provided with a socket longitudinally in the same, to receive and grasp one end of the pencil, or a tenon extending from it, in such a manner that the pencil forms a handle for the erasive head, and that said erasive head can be used with convenience. The invention also consists in a solid elastic erasive head for a lead-pencil or other similar article, said head being provided with a socket to receive one end of a lead-pencil or other similar article, or a tenon extending from it, while the upper part of said socketed head is made with working erasive surfaces or swells projecting from its sides, so that the erasive properties of the head are increased, and said head can be used conveniently for erasing certain lines or marks without touching other lines or marks in close proximity thereto, and the part or one of the projecting erasive surfaces in contact with the lines or marks to be erased, while in use, can be employed for such purpose without using the remainder or the other projecting erasive working surfaces, which projecting erasive working surfaces or swells may be of any form convenient for the purpose.

In the drawing, the letter A designates a lead-pencil, and the letter B one of the erasive heads as applied thereto. The said head may have a flat top surface, or its top may be of a semicircular or conical shape, or any other that may be desirable, so long as the said projecting erasive surfaces or swells are retained. Within one end of said head is formed a cylindrical or other proper shaped socket or cavity. This socket is usually made to extend about two-thirds through the head, and in the direction of its axis; but, if desirable, the socket or bore may extend entirely through the said head, provided that said head is made with projecting erasive surfaces or swells, and not in the mere shape of a tube. The diameter of the socket should be a very little smaller than that of the pencil or tenon extending from the pencil to be inserted in it. The elastic erasive head so made is to fit upon a lead-pencil at or near one end thereof, or upon a tenon formed at said end, and it is to be so constructed as to surround the part on which it is to be placed, and be held thereon by the inherent elasticity of the material of which the head may be composed. The said head is to be composed of india-rubber or india-rubber and some other material which will increase the erasive properties of the head—such as powdered emery, for instance.

The drawings exhibit the elastic head so made as to cover the end, as well as to extend around and project beyond the sides of the pencil, said head being provided with projecting erasive surfaces or swells at its upper end, so that in using the same it can be readily brought to act on certain lines or marks without touching other lines or marks in close proximity thereto, and that while one of said projecting erasive surfaces, or one portion of said projecting swells, is in use, the others or remaining parts are untouched, and remain for new use, and the respective projecting swells may be used independently of each other. This object is attained by either of the forms shown in the drawing, or by a head of any other form which has similar projecting erasive surfaces or swells, and which encompasses the pencil and presents such erasive surfaces beyond the sides of the same.

The stem *a* of the head, may be tapering down nearly to a sharp edge, so that the same, when applied to a pencil without a tenon, will go on readily, and make a good finish.

Such an erasive head, made and applied to a pencil in the manner above set forth, is of great practical utility and advantage to book-keepers, accountants, and various other persons, and it may be applied not only to lead-pencils, but also to other articles of a like character.

What is claimed as new, and desired to be secured by Letters Patent, is—

1. The combination, with a pencil or other similar article, of a solid elastic erasive head, provided with a socket longitudinally in the same, to receive and grasp one end of the pencil or other similar article, or a tenon extending from it, substantially in the manner and for the purpose shown and described.

2. A solid elastic erasive head for a lead-pencil or other similar article, provided with a socket to receive one end of the lead-pencil or other similar article, or a tenon extending from it, and made with projecting erasive surfaces or swells, substantially in the manner and for the purpose set forth.

3. The combination of a stem tapering down to a sharp edge, or nearly so, with a solid elastic erasive head for a lead-pencil or other similar article, said stem being provided with a socket to receive one end of the lead-pencil or other similar article, or a tenon extending from it, while the head is made with projecting erasive surfaces or swells, substantially in the manner and for the purpose set forth.

4. The combination, with a pencil, of a solid elastic erasive head, made with projecting erasive surfaces or swells, and provided with a socket longitudinally to receive and grasp one end of the pencil or other similar article, or a tenon extending from it, substantially as shown and described.

In testimony that we claim the foregoing as the invention of said BLAIR we have caused our president hereunto to set his hand and affix our corporate seal this 20th day of March, 1875.

THE RUBBER TIP PENCIL COMP. [L. S.]
By EBERHARD FABER, *President.*

Witnesses:
W. HAUFF,
JOHN S. WASHBURN.